United States Patent [19]

Fejes

[11] Patent Number: 5,132,019
[45] Date of Patent: Jul. 21, 1992

[54] METHOD OF REMOVING CORROSION PRODUCTS IN A WATER CIRCULATION SYSTEM

[75] Inventor: Peter Fejes, Västerås, Sweden

[73] Assignee: ABB Atom AB, Västerås, Sweden

[21] Appl. No.: 674,903

[22] Filed: Mar. 26, 1991

[30] Foreign Application Priority Data

Mar. 30, 1990 [SE] Sweden .................................. 9001177

[51] Int. Cl.$^5$ ............................................. B01D 15/04
[52] U.S. Cl. ..................................... 210/660; 210/663; 210/675; 210/676; 210/774; 210/778
[58] Field of Search ............... 210/660, 663, 670, 673, 210/676, 678, 675, 777, 778, 774

[56] References Cited

U.S. PATENT DOCUMENTS

| | | | |
|---|---|---|---|
| 2,862,622 | 12/1958 | Kircher, Jr. et al. | 210/778 |
| 3,250,703 | 5/1966 | Levendusky | 210/193 |
| 3,250,704 | 5/1966 | Levendusky | 210/193 |
| 3,674,686 | 7/1972 | Brimmer et al. | 210/178 |
| 4,684,494 | 8/1987 | Dagard | 210/778 |
| 4,786,527 | 11/1988 | Fejes et al. | 210/193 |

Primary Examiner—Stanley S. Silverman
Assistant Examiner—Cynthia L. Nessler
Attorney, Agent, or Firm—Watson, Cole, Grindle & Watson

[57] ABSTRACT

Particles of an ion exchange resin are brought into contact with water in a water circulation system in a power plant for capturing corrosion products and other impurities and are removed after reaction with the corrosion products and the other impurities from the water circulation system, the water circulation system including a reactor vessel or a steam generator connected thereto for generation of steam, a steam turbine driven by the steam, a condenser for condensing the steam from the steam turbine and a condensate cleaning filter for cleaning condensate formed in the condenser, as well as one or more pumps for effecting the water circulation and returning cleaned condensate to the reactor vessel or the steam generator. The ion exchange resin is supplied successively to the condensate in the water circulation system at a sufficient distance from the condensate cleaning filter for the ion exchange resin, when being collected in the form of layers in the condensate cleaning filter, to have been substantially exhausted by reaction with corrosion products and other impurities during the movement of the water from the supply point for the ion exchange resin to the condensate cleaning filter. The exhausted ion exchange resin collected in the condensate cleaning filter is removed after a certain period of collection from the condensate cleaning filter.

5 Claims, 1 Drawing Sheet

METHOD OF REMOVING CORROSION PRODUCTS IN A WATER CIRCULATION SYSTEM

BACKGROUND OF THE INVENTION

Nuclear power plants and other heat-generating power plants, such as coal, oil and gas power plants, are normally equipped with a circulation system for water, in which steam, which is generated in a reactor vessel or in a steam generator connected thereto, is passed to a steam turbine, from there to a condenser and condensate formed therein, after cleaning in a condensate cleaning filter and preheating, is returned to the reactor vessel or the steam generator. For the cleaning of the condensate, normally ion exchange resin is used.

In operation of power plants of the kinds mentioned above various corrosion products are formed in the circulation system, inter alia in the form of oxides containing one or several metals of the kinds included in construction material in the circulation system, such as, above all, iron, further, inter alia, nickel, cobalt, chromium, copper, titanium, molybdenum, zinc and zirconium. In the event that a nuclear reactor vessel is included in the circulation system, the corrosion products will be radioactive. In addition, impurities may enter the circulation system through leakage. When cleaning the water in the condensate cleaning filter with ion exchange resin, corrosion products and other impurities are captured by the ion exchange resin.

A condensate cleaning filter in the form of an ion exchange resin often comprises a chamber containing a plurality of filter elements, each one consisting of a liquid-permeable support matrix and a layer, generated thereon in the chamber, of finely divided particles of an organic ion exchange resin ("precoat filter"). The layer of the ion exchange resin may be applied on the support matrix by arranging the filter in a liquid circulation system and supplying to the liquid a suspension of the ion exchange resin while the liquid is circulated in the circulation system. This circulation system is used only for preparation of the filter by coating the support matrix with the ion exchange resin.

When a condensate cleaning filter of the above-mentioned kind has been in service for a certain period of time, the ion exchange resin is removed, usually by backwashing, and is replaced with a new ion exchange resin.

When cleaning the water, ionic corrosion products of a non-colloidal nature, as well as any other ionic impurities of a non-colloidal nature, are captured by the ion exchange resin and penetrate into the interior of the grains of the ion exchange resin, whereas colloidal corrosion products and any other colloidal impurities are successively collected on the surface of the ion exchange resin grains and block an increasingly greater part of the electrical charge of the ion exchange resin, so that its ability to fulfill its primary task of rendering the mentioned ionic substances harmless is increasingly deteriorated, while at the same time the packing density of the layer of ion exchange resin increases and hence the pressure drop across the filter. This process, in order for the condensate cleaning filter to have the prescribed cleaning effect and to provide a sufficiently low pressure drop, results in the ion exchange resin having to be replaced by new ion exchange resin without the used ion exchange resin being at all fully consumed.

According to the present invention, a drastic reduction of the consumption of ion exchange resin is obtained, while at the same time the process for the coating of the support matrices of the condensate cleaning filter is eliminated.

SUMMARY OF THE INVENTION

The present invention relates to a method of bringing particles of an ion exchange resin into contact with water in a water circulation system in a power plant for capturing corrosion products and other impurities and of removing ion exchange resin which has reacted with the corrosion products and the other impurities, respectively, from the water circulation system, the water circulation system comprising a reactor vessel or a steam generator connected thereto for generation of steam, a steam turbine driven by the steam, a condenser for condensing the steam from the steam turbine and a condensate cleaning filter for cleaning condensate formed in the condenser, as well as one or more pumps for effecting the water circulation and returning cleaned condensate to the reactor vessel or the steam generator. The method is characterized in that the ion exchange resin is successively supplied to the condensate in the water circulation system at a sufficient distance from the condensate cleaning filter for the ion exchange resin, when it has been collected in the form of layers in the condensate cleaning filter, at least in all essentials to have been exhausted by reaction with corrosion products and other impurities during the movement of the water from the supply point for the ion exchange resin to the condensate cleaning filter, the exhausted ion exchange resin collected during a certain period of time in the condensate cleaning filter then being removed from the condensate cleaning filter. Normally, the exhausted ion exchange resin collected in the condensate cleaning filter is removed from the condensate cleaning filter when the pressure drop across the filter has a value of 0.18-0.25 MPa.

According to the present invention, the ion exchange resin is thus not applied as a coating in the condensate cleaning filter in the conventional manner from a separate circulation system, provided for the coating alone, which is supplied with ion exchange resin, before the condensate cleaning filter is connected into the water circulation system with, inter alia, a steam turbine and a condenser. Instead, the ion exchange resin is supplied to the last-mentioned water circulation system and is given the opportunity to react with the corrosion products and the other impurities to be collected, in the reacted state, in the condensate cleaning filter which then primarily acts as a mechanical filter. Since in this way the particles of the ion exchange resin and the corrosion products and the other impurities, respectively, for a relatively long time come into contact with one another, the ion exchange resin is utilized efficiently and no part thereof is screened off, as in previously known cases, from contact with the corrosion products and the other impurities.

The ion exchange resin is preferably supplied to the condensate at such a distance from the condensate cleaning filter that the movement of the water to the condensate cleaning filter takes at least one minute.

The removal of reacted ion exchange resin from the condensate cleaning filter suitably takes place after ion exchange resin has been supplied to the condensate and collected in the condensate cleaning filter for a period of at least three weeks and preferably when the amount of such ion exchange resin amounts to 0.1–1 kg per m² filter surface.

The amount of ion exchange resin successively supplied to the water circulation system is suitably so large that ion exchange resin collected in the condensate cleaning filter amounts to 0.005–0.020 kg per m² filter surface a day.

It is previously known per se to supply ion exchange resin to a water circulation system of the above-described kind, but in that case the supply takes place while using a filter which has already been provided with a coating of ion exchange resin in a conventional manner, in order to seal any leaks in the filter and in immediate proximity to the filter so that there is no time for reaction with corrosion products during the move to the filter.

The invention will be explained in greater detail, by way of example, with reference to the accompanying, drawings.

DETAILED DESCRIPTION OF THE PREFERRED EMBODIMENT

Figure 1:
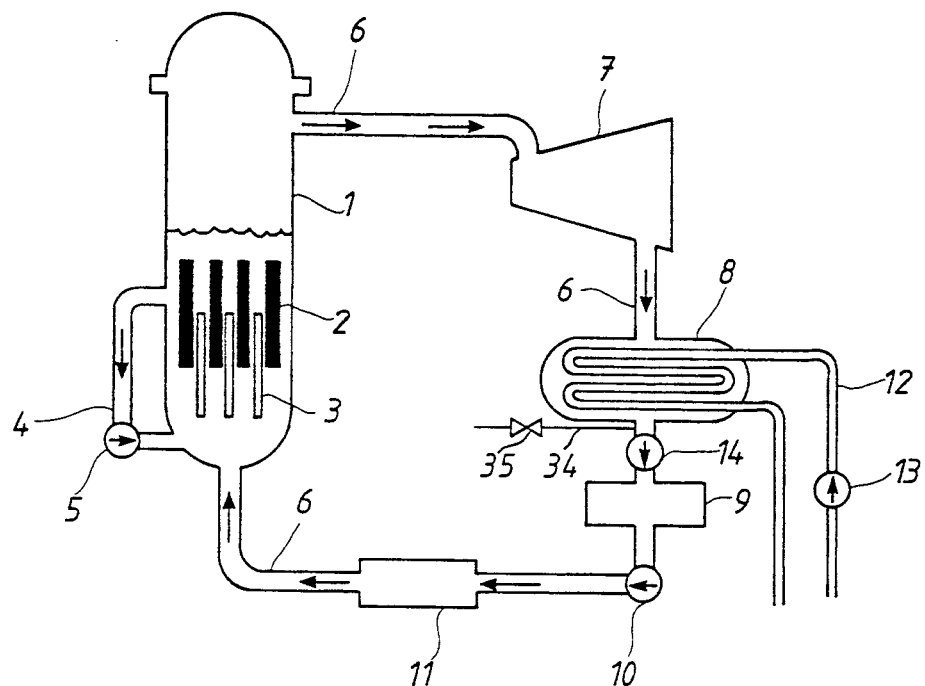
FIG. 1 schematically shows a boiling water reactor for a nuclear power plant with a water circulation system, and FIG. 2 schematically shows on a enlarged scale that part of the water circulation system where the ion exchange resin is supplied.

The boiling water reactor shown in FIG. 1 has a reactor vessel 1 with fuel elements 2, control rods 3 and main circulation systems 4, of which one is shown in the figure. Each main circulation system has a pump 5. The main circulation pumps ensure that the reactor core is sufficiently cooled. The reactor vessel is part of a water circulation system 6, which also includes a steam turbine 7, a condenser 8, a condensate cleaning filter 9, pumps 10 and 14 and a preheater 11. Steam generated in the reactor core delivers its energy to the rotor of the turbine and is condensed, after the passage through the turbine, in the condenser with a cooling water circuit 12 comprising a pump 13. The condensate from the condenser 8 is transported by the condensate pump 14 through the condensate cleaning filter 9 and the condensate cleaned therein is fed, after preheating in the preheater 11, into the reactor core with the feed pump 10.

Figure 2:
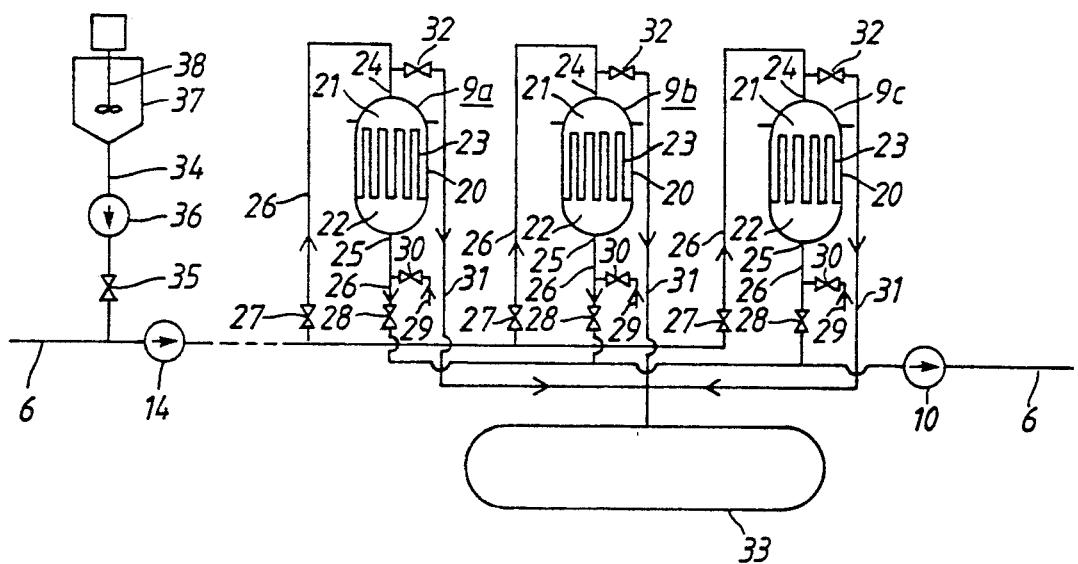

FIG. 2 shows that part of the water circulation system which comprises the condensate pump 14, the condensate cleaning filter 9, and the feed pump 10. The condensate cleaning filter 9 comprises a number of units, often as much as ten units parallel-connected in the circulation system 6, of which only three units 9a, 9b, 9c are shown in the figure. Of these units, one or more may be shut down for cleaning, normally by backwashing, whereas the others are in operation. Each condensate cleaning filter 9 (9a, 9b, 9c) consists of a pressure vessel 20, which is divided into an upper chamber 21 and a lower chamber 22. The pressure vessel includes a large number of liquid-permeable tubular filter elements 23, of which only four are shown in the figure. In the exemplified case each filter unit consists of a perforated steel tube, which is provided on the outside with a wrapping of polypropylene fibres. The inlet side of the filter element for the medium to be treated faces the upper chamber 21, which in turn is provided with an inlet 24 for this medium, whereas the outlet side of the filter element communicates with the lower chamber 22 which in turn is provided with an outlet 25. Each one of the pressure vessels is connected, by means of conduits 26 with openable and closable valves 27 and 28, to the water circulation system 6. Each one is also connected, by means of a conduit 29 with an openable and a closable valve 30, to a pressurized water source to which pressure gas can be supplied for backwashing, and to a conduit 31 with an openable and a closable valve 32 for diverting backwashed material to a backwashing tank 33.

Between the condenser 8 and the condensate pump 14, preferably at the so-called hot-well of the condenser, a tank 37 with ion exchange resin is connected to the water circulation system 6 by means of a conduit 34 with an openable and a closable valve 35 and with a dosage pump 36. The tank is provided with an agitator 38. In the exemplified case, a mixture of one part by weight of an anion exchange resin and two parts by weight of a cation exchange resin is prepared in the tank. The anion exchange resin consists, for example, of a polystyrene with quaternary ammonium groups, crosslinked with 8 percent by weight divinyl benzene, the sum formula of which is $C_{10.92}H_{16.44}(NO)_{0.92}$ and mole weight 175, and the cation exchange resin of sulphonated polystyrene crosslinked with 8 percent by weight divinyl benzene, the sum formula of which is $C_{8.16}H_{8.16}(SO_3)_{0.92}$ and mole weight 180. The particles of the anion exchange resin, as well as the particles of the cation exchange resin have, in the exemplified case, a mean particle size of 35 μm whereas the dry substance content of the suspended ion exchange resin amounts to 10 percent by weight. FIG. 1 only shows the part of the conduit 34 which is located nearest the circulation system 6, and thus does not show the pump 36 and the tank 37 connected to this conduit.

According to the present invention, ion exchange resin is supplied continuously from the tank 37 via the conduit 34 to the water circulation system 6. During operation the valve 35 and the valves 27 and 28 are then open, whereas the valves 30 and 32 are closed in those filters 9 (9a, 9b, 9c) which are in operation for the cleaning. The ion exchange resin supplied to the circulation system 6 through the conduit 34 is collected, during the operating period, onto the filter elements 23 in these filters in the form of coatings on the filter elements. In one exemplified case the added amount of ion exchange resin is such that, in the form of a coating on the filter elements, it amounts to 0.012 kg per m² filter surface and day. At a water velocity of around 2 m/s in the circulation system 6, the addition of the ion exchange resin takes place at a distance of at least 120 m from the condensate cleaning filter in order for the ion exchange resin and the corrosion products and other impurities to have time to react for a period of at least 1 minute and thus ensure that the ion exchange resin in all essentials has completed its reaction and thus is consumed when being collected in the filters which are in operation for the cleaning, provided that no surplus of ion exchange resin has been added. When the coating on the filter elements in the exemplified case provides a pressure drop of 0.18–0.25 MPa in any of these filters, whereby the amount of ion exchange resin on the filter normally amounts to 0.1–1 kg per m² filter surface, the valves 27 and 28 are closed and the valves 30 and 32 in this filter are opened for cleaning of the filter by backwashing, resulting in water being supplied under pressure, possibly together with a gas, via the conduit 29 and after passage of the filter elements 23 together with consumed ion exchange resin being discharged via the conduit 31 to be collected in the tank 33. After cleaning, this filter is connected for use in a new cleaning cycle. In an analogus manner, other filters are disconnected when they need to be cleaned, and are then connected again after cleaning.

I claim:

1. A method of bringing particles of an ion exchange resin into contact with water in a water circulation system in a power plant for capturing corrosion products and other impurities and of removing ion exchange resin which has reacted with the corrosion products and the other impurities, respectively, from the water circulation system, the water circulation system comprising a reactor vessel or a steam generator connected thereto for generation of steam, a steam turbine driven by the steam, a condenser for condensing the steam from the steam turbine and a condensate cleaning filter for cleaning condensate formed in the condenser, as well as one or more pumps for effecting water circulation and returning cleaned condensate to the reactor vessel or the steam generator, the method comprising the steps of supplying the ion exchange resin to the condensate in the water circulation system at a sufficient distance from the condensate cleaning filter for the ion exchange resin, when it has been collected in the form of layers in the condensate cleaning filter, to be substantially exhausted by reaction with corrosion products containing metals from the group consisting of iron, nickel, cobalt, chromium, copper, titanium, molybdenum, zinc and zirconium during the movement of the water from the supply point for the ion exchange resin to the condensate cleaning filter, and then removing the exhausted ion exchange resin collected during a certain period of time in the condensate cleaning filter from the condensate cleaning filter.

2. A method according to claim 1, wherein the ion exchange resin is supplied to the condensate at such a distance from the condensate cleaning filter that movement of the water to the condensate cleaning filter takes at least one minute.

3. A method according to claim 1, wherein the removal of exhausted ion exchange resin from the condensate cleaning filter takes place after ion exchange resin has been supplied to the condensate and collected in the condensate cleaning filter for a period of at least three weeks.

4. A method according to claim 1, wherein the amount of ion exchange resin continuously supplied to the water circulation system is so large that ion exchange resin collected in the condensate cleaning filter amounts to 0.005–0.020 kg per $m^2$ filter surface a day.

5. A method according to claim 1 wherein the removal of exhausted ion exchange resin collected in the condensate cleaning filter takes place when the amount of such ion exchange resin amounts to 0.1–1 kg per $m^2$ filter surface.

* * * * *